Patented Jan. 25, 1944

2,339,757

UNITED STATES PATENT OFFICE 2,339,757

DRYING NORMALLY OPAQUE STARCHY PRODUCTS BY RADIANT ENERGY

John M. Baer, Chicago, Ill., assignor to The Guardite Corporation, a corporation of Illinois No Drawing. Application January 19, 1942, Serial No. 427,396

4 Claims. (Cl. 34—15)

This invention relates to the drying of normally opaque wet starchy materials under vacuum primarily by means of radiant energy, and more particularly to the preliminary treatment of the starchy material to impart a tendency toward translucency therein so that at least during the latter stages of drying the normally opaque material will be translucent and, as a result, the radiant energy will be better distributed throughout the material and drying will be more uniform.

The invention relates primarily to the drying of materials such as white potatoes. When potatoes are dried in thin layers under vacuum the resulting product is opaque, white and chalky. When dried in accordance with the process herein described, the potato is translucent almost to the state of being transparent, honey-colored, and has a smooth almost vitreous appearance. In spite of its appearance, however, the product of this invention will rehydrate to form a white mealy potato in a very short time and the rehydrated material will more closely resemble the original potato in taste than does the normally opaque material. In fact in many tests the product of this invention has proved indistinguishable from the original material in taste and consistency after both the original and this material had been cooked.

The tendency toward translucency is preferably imparted to the product by a preliminary rapid heat treatment. Neither this preliminary treatment nor the subsequent drying treatment is sufficient to cook the potato which emerges from the drying operation in a raw condition. The preliminary heat treatment is produced by slicing the potato into thin slices, preferably not more than ⅜ inch in thickness, then removing air from the product and rapidly bringing its temperature to approximately 165° F. or higher, maintaining the potato at this point for a few minutes, and then rapidly lowering the temperature by decreasing the pressure.

This treatment does not produce any immediate change in the appearance of the potato but, as drying thereafter proceeds, the potato becomes translucent as dryness approaches so that at the close of drying, when the tendency of the potato to scorch or become overdried on the surface is greatest, the potato is permeable to radiant heat energy and, therefore, this energy is distributed throughout the potato instead of being confined to its surface areas.

For example, raw red McClure potatoes were sliced transversely of the potato in ⅜ inch slices and placed in a vacuum chamber on a tray between two radiant heat plates. The pressure was lowered until the temperature of the potatoes had dropped from 70° to 63° F. and the pressure had fallen to approximately 12 mm. Superheated steam was then introduced which had an initial temperature of approximately 700° F. under 40 lbs. pressure to bring the temperature from 63° F. to 176° F. in 3 minutes. The absolute pressure at this point was approximately 12 inches. The material was held at this temperature and pressure for 2 minutes, whereupon the pressure was lowered in 3 minutes to 20 mm. and the temperature reduced in that time to 77° F. Drying was then continued, the heat energy being predominantly supplied by low temperature radiation (approximately 265° F.) while maintaining the pressure at about 32 mm. Superheated steam was also supplied to the chamber but in quantities which supplied relatively little heat comparable to the radiant energy. When the potatoes had nearly reached the point of dryness, which does not mean absolute dryness, but the desirable end point of 4% to 6%, they began to become translucent and the last few per cent of water were removed while the potatoes were translucent.

In general the heating step requires a temperature above 165° F. and low enough not to cook the material. Of course the length of the heating period depends upon the temperature employed, but 2 minutes at 175° F. to 180° F. with rapid heating to that point and rapid cooling from it has proved highly satisfactory.

The final starchy product has a moisture content of less than 10%. The temperature of the product during drying, which originally will be less than 150° F. and preferably is not substantially more than 100° F., will rise markedly. In most cases drying will be completed at temperatures above 175° F. but, in spite of this fact, the potato will not become translucent unless it has had the preliminary treatment. The reasons for this are not at all understood.

The foregoing detailed description has been given for clearness of understanding only, and no unnecessary limitations should be understood therefrom.

What I claim as new and desire to secure by Letters Patent is:

1. The method of drying potatoes which comprises dividing the potato into thin particles, rapidly heating the particles to a temperature above 165° F., and maintaining the particles at such temperature for a short time, insufficient to cook the potato, lowering the temperature below 150°

F., and drying the product at low pressure with predominantly radiant energy, whereby the product becomes translucent as dryness approaches.

2. The method as set forth in claim 1, in which the drying is carried out in the presence of rapidly moving superheated steam.

3. The method as set forth in claim 1, in which the product is initially subjected to a high vacuum to remove air and produce an atmosphere of steam, and the temperature is rapidly raised in such atmosphere by the addition of steam and cooling is produced by rapidly reducing the pressure.

4. The method as set forth in claim 1, in which the preliminary heat treatment is at a temperature of approximately 175° F. for a period of approximately 2 minutes.

JOHN M. BAER.